(12) United States Patent
Koike et al.

(10) Patent No.: US 7,401,597 B2
(45) Date of Patent: Jul. 22, 2008

(54) FUEL SUPPLY DEVICE FOR MOTORCYCLE AND MOTORCYCLE

(75) Inventors: Munetaka Koike, Shizuoka (JP); Shidehiko Miyashiro, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 22 days.

(21) Appl. No.: 11/550,698

(22) Filed: Oct. 18, 2006

(65) Prior Publication Data
US 2007/0089713 A1 Apr. 26, 2007

(30) Foreign Application Priority Data
Oct. 20, 2005 (JP) ............................. 2005-305637
Mar. 27, 2006 (JP) ............................. 2006-086251

(51) Int. Cl.
*F02M 37/04* (2006.01)
(52) U.S. Cl. .................................................. 123/509
(58) Field of Classification Search .................. 123/509
See application file for complete search history.

(56) References Cited
U.S. PATENT DOCUMENTS 4,871,041 A * 10/1989 Saito et al. ................. 180/219
6,182,640 B1 * 2/2001 Nakashima et al. ......... 123/516
6,253,790 B1 * 7/2001 Hara ....................... 137/565.17
6,357,424 B1 * 3/2002 Sonoda et al. .............. 123/509
6,401,750 B2 * 6/2002 Tokunaga .............. 137/565.34
6,626,155 B1 * 9/2003 Ueda et al. .................. 123/509
6,655,363 B2 * 12/2003 Kobayashi et al. .......... 123/509
6,907,865 B1 * 6/2005 Hanby ........................ 123/509
2002/0038653 A1 * 4/2002 Kobayashi et al. .......... 123/509
2005/0045399 A1 * 3/2005 Kudo et al. ................. 180/219

FOREIGN PATENT DOCUMENTS
JP 2002-293281 10/2002

* cited by examiner

*Primary Examiner*—Thomas N Moulis
(74) *Attorney, Agent, or Firm*—Hogan & Hartson LLP

(57) ABSTRACT

A fuel supply device for a motorcycle facilitates a narrower vehicle width to improve maneuverability. A fuel tank is disposed above a body frame, and a first fuel pump is fixed to a part of the fuel tank facing the body frame and positioned inside of the fuel tank via a mount seat. The first fuel pump is disposed such that at least a portion of the mount seat overlaps the vehicle body frame as viewed from above the motorcycle.

23 Claims, 9 Drawing Sheets

FUEL SUPPLY DEVICE FOR MOTORCYCLE AND MOTORCYCLE

RELATED APPLICATIONS

This application claims the benefit of priority under 35 USC 119 of Japanese patent application no. 2005-305637, filed on Oct. 20, 2005, and Japanese patent application no. 2006-086251, filed on Mar. 27, 2006, which applications are hereby incorporated by reference in their entireties.

BACKGROUND OF THE INVENTION

1. Field of the Invention

The present invention relates to a fuel supply device that supplies fuel to an engine of a motorcycle.

2. Description of Related Art

A fuel supply device for a motorcycle is disclosed in JP-A-2002-293281. This fuel supply device has a suction section of a fuel pump disposed out of a fuel tank, and has an expelling section communicating with the lowest portion of the fuel tank from an external location and disposed out of the fuel tank. An outer conduit connects the suction section and the expelling section to each other. The fuel tank straddles over a right and left pair of frame structural members (upper pipes) forming a front half portion of a vehicle body frame. The fuel pump is attached to a bottom surface of the fuel tank so that the fuel pump is positioned between the right and left frame structural members as viewed in a fore to aft direction of the vehicle, and a lower portion of the fuel pump protrudes downward beyond the bottom surface. The protruding portion has the suction section. Thereby, an ineffective residual amount of fuel in the fuel tank is reduced, external appearance and arrangement around the fuel tank is improved, and a capacity of the fuel tank is expanded.

In a conventional fuel supply device as described above, because the suction section is disposed outside of and protrudes from the fuel tank, it is difficult to narrow a width of the vehicle in the fuel tank portion.

On the other hand, in a vehicle on which a rider frequently rides under a standing condition always a narrower width of the vehicle around the fuel tank narrower is always needed to improve maneuverability.

SUMMARY OF THE INVENTION

Therefore, the present invention provides a fuel supply device for a motorcycle that makes a vehicle width narrower to improve maneuverability.

A fuel supply device for a according to the invention comprises a body frame extending in a fore to aft direction of a motorcycle, a fuel tank disposed above the body frame, and a first fuel pump attached to a bottom portion of the fuel tank via a mount seat. At least a portion of the mount seat overlaps the body frame as viewed in a width direction of the motorcycle.

In one embodiment, the body frame includes a right frame and a left frame in the width direction of the motorcycle, and the first fuel pump is positioned between the right frame and the left frame in the width direction.

In another embodiment, the fuel tank includes a right side tank section positioned on an outer lateral side of the right frame, a left side tank section positioned on an outer lateral side of the left frame, and a connecting section for connecting the right side tank section and the left side tank section such that the connecting section straddles the right frame and the left frame.

In another embodiment, the first fuel pump is disposed within the fuel tank to incline rearward and downward of the motorcycle.

In another embodiment, a pump support member for supporting the first fuel pump is disposed between the first fuel pump and the mount seat.

In another embodiment, a partition plate is provided for partitioning the bottom portion of the fuel tank into a side of the mount seat and another side of a first liquid accumulating section in which a suction port of the first fuel pump is positioned.

In another embodiment, a bottom surface of the first liquid accumulating section is positioned lower than a bottom surface of the mount seat.

In another embodiment, the pump support member includes the partition plate partitioning the bottom portion of the fuel tank.

In another embodiment, a second liquid accumulating section is formed on the side of the mount seat of the bottom portion of the fuel tank, a bottom surface of the second liquid accumulating section is positioned lower than a bottom of the first liquid accumulating section, and the bottom of the second liquid accumulating section has a second fuel pump that suctions fuel accumulating in the second liquid accumulating section and expels the fuel to the first liquid accumulating section.

In another embodiment, a filter is connected to the suction port of the first fuel pump, and the suction port of the first fuel pump and the filter are disposed.

In another embodiment, the second fuel pump is a jet pump suctioning the fuel accumulating in the second liquid accumulating section using a negative pressure generated by a flow of surplus fuel returning from an injector of the first fuel pump.

In another embodiment, the second liquid accumulating section is formed in a front portion of the fuel tank.

In another embodiment, a rider's seat covers a top surface of the fuel tank as viewed from a lateral side of the motorcycle.

In another embodiment, the fuel tank has a fuel supply port for supplying fuel to an engine, and the fuel supply port is positioned at a bottom portion and a peripheral end portion of the fuel tank.

In another embodiment, the fuel supply port is positioned between a right end and a left end of the body frame.

In another embodiment, the first fuel pump is generally positioned at a center of the fuel tank in the width direction, the fuel supply port is positioned on one side in the width direction relative to a position where the first fuel pump is disposed, and the filter is positioned on the other side in the width direction relative to the position where the first fuel pump is disposed.

In another embodiment, an accumulating chamber disposed in the first liquid accumulating section and having the suction port of the first fuel pump is provided, and a supply port connecting the first liquid accumulating section and an inside of the accumulating chamber to each other is formed at a top surface of the accumulating chamber.

In another embodiment, the accumulating chamber is positioned at a bottom end which is the lowest portion of the first liquid accumulating section.

In another embodiment, a filter is connected to the suction port of the first fuel pump, and the filter is positioned in the inside of the accumulating chamber.

In another embodiment, the accumulating chamber includes an enclosing section for enclosing the filter, and a separating wall is spaced a predetermined distance apart from the enclosing section to cover the enclosing section, and the separating wall has the supply port.

In another embodiment, the supply port is positioned at a center portion of the top surface.

In another embodiment, the accumulating section has an auxiliary expelling port for expelling surplus fuel returning from an injector of the first fuel pump.

In another embodiment, a second liquid accumulating section is formed on the side of the mount seat of the bottom portion of the fuel tank, a bottom surface of the second liquid accumulating section is positioned lower than a bottom surface of the first liquid accumulating section, and the bottom of the second liquid accumulating section has a second fuel pump that suctions fuel accumulating in the second liquid accumulating section and expels the fuel to the accumulating chamber.

is the invention also provides a motorcycle with a body frame extending in a fore to aft direction, a fuel tank disposed above the body frame, and a first fuel pump attached to a bottom portion of the fuel tank via a mount seat. At least a portion of the mount seat overlaps the body frame in a width direction of the motorcycle.

According to the present invention, the fuel pump is disposed in such a manner that at least a portion of the mount seat overlaps the vehicle body frame as viewed from above the vehicle; thereby, the vehicle width is narrower and maneuverability is improved.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
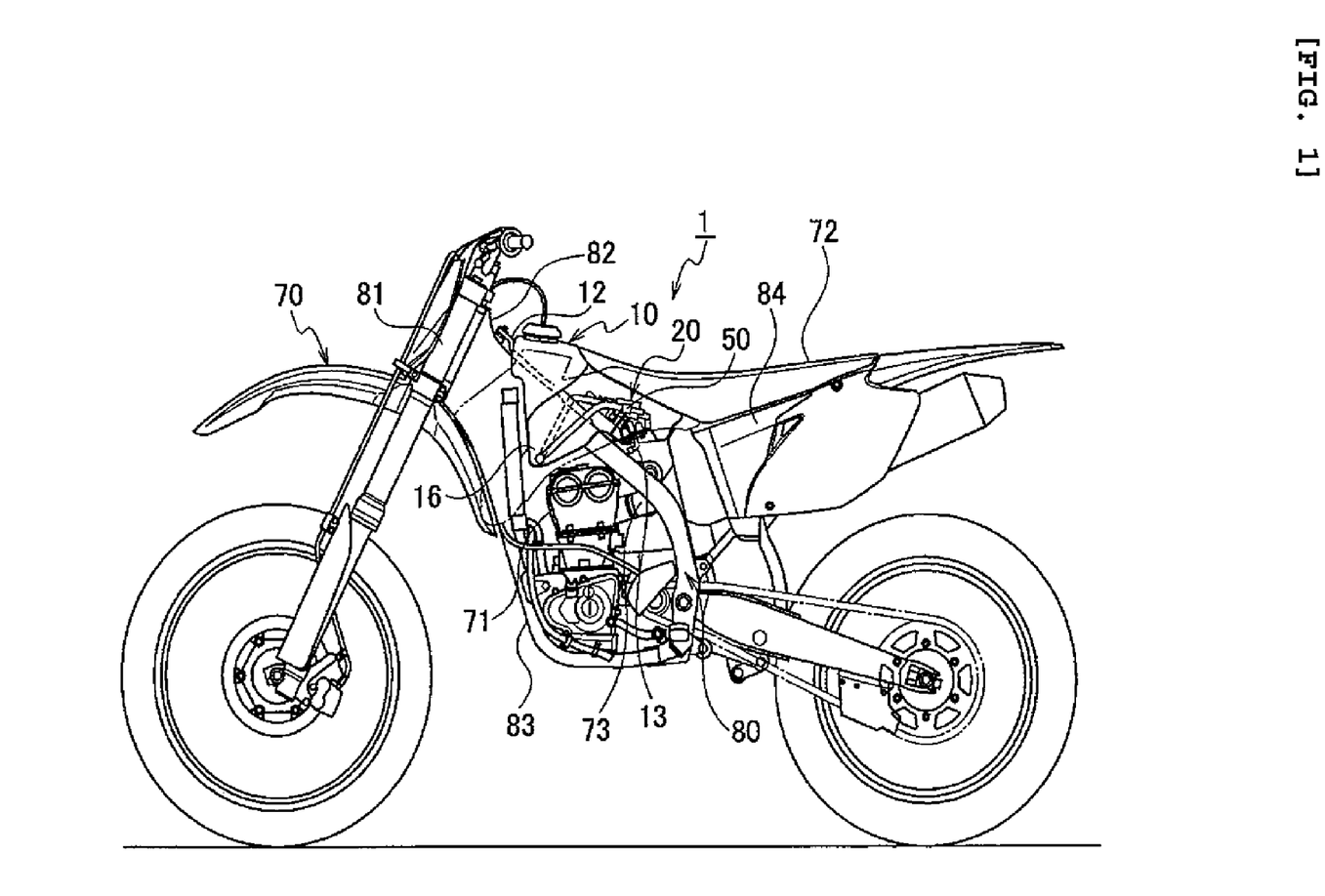
FIG. 1 is a side elevational view of a fuel supply device according to the invention which is under a mounted condition to a vehicle.
Figure 2:
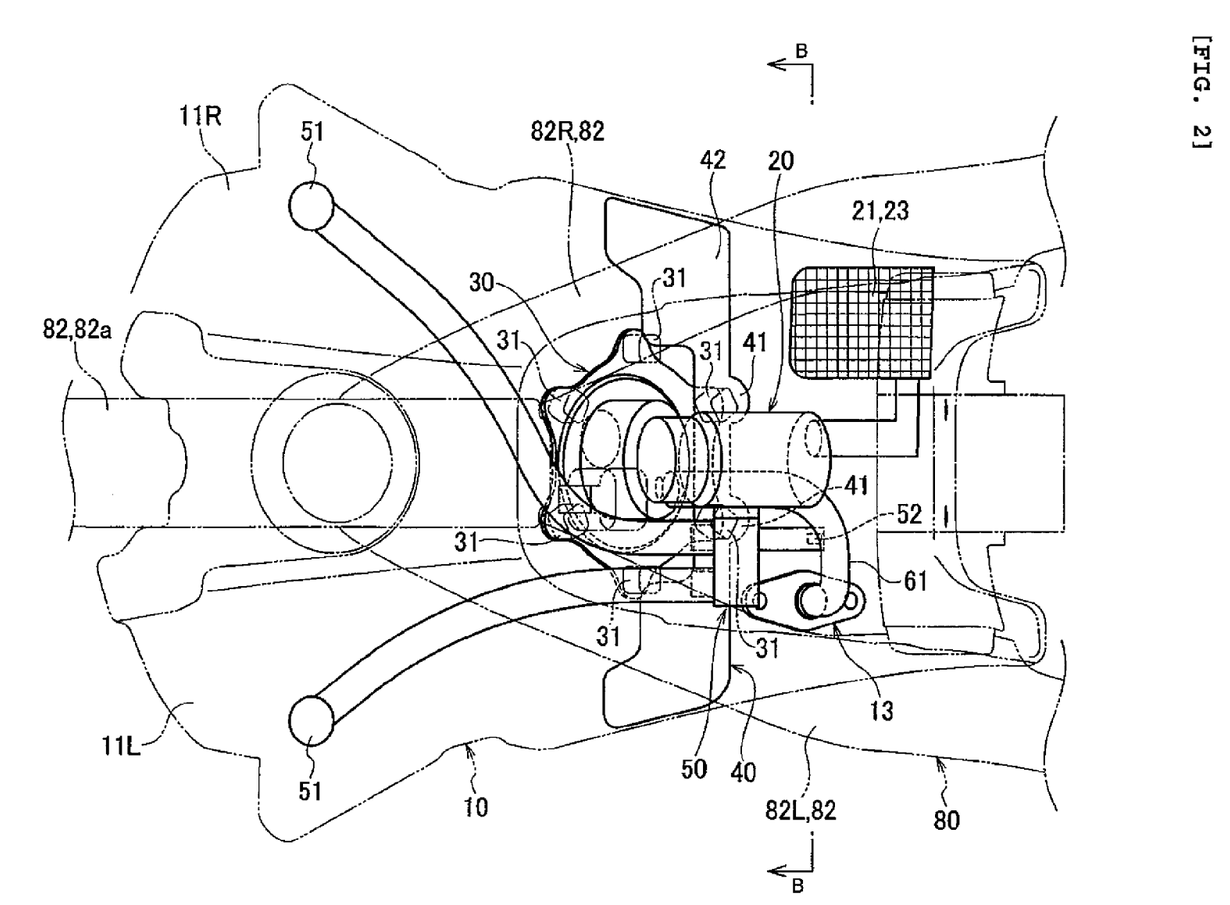
FIG. 2 is a top plan view of the fuel supply device and vehicle of FIG. 1.
Figure 3:
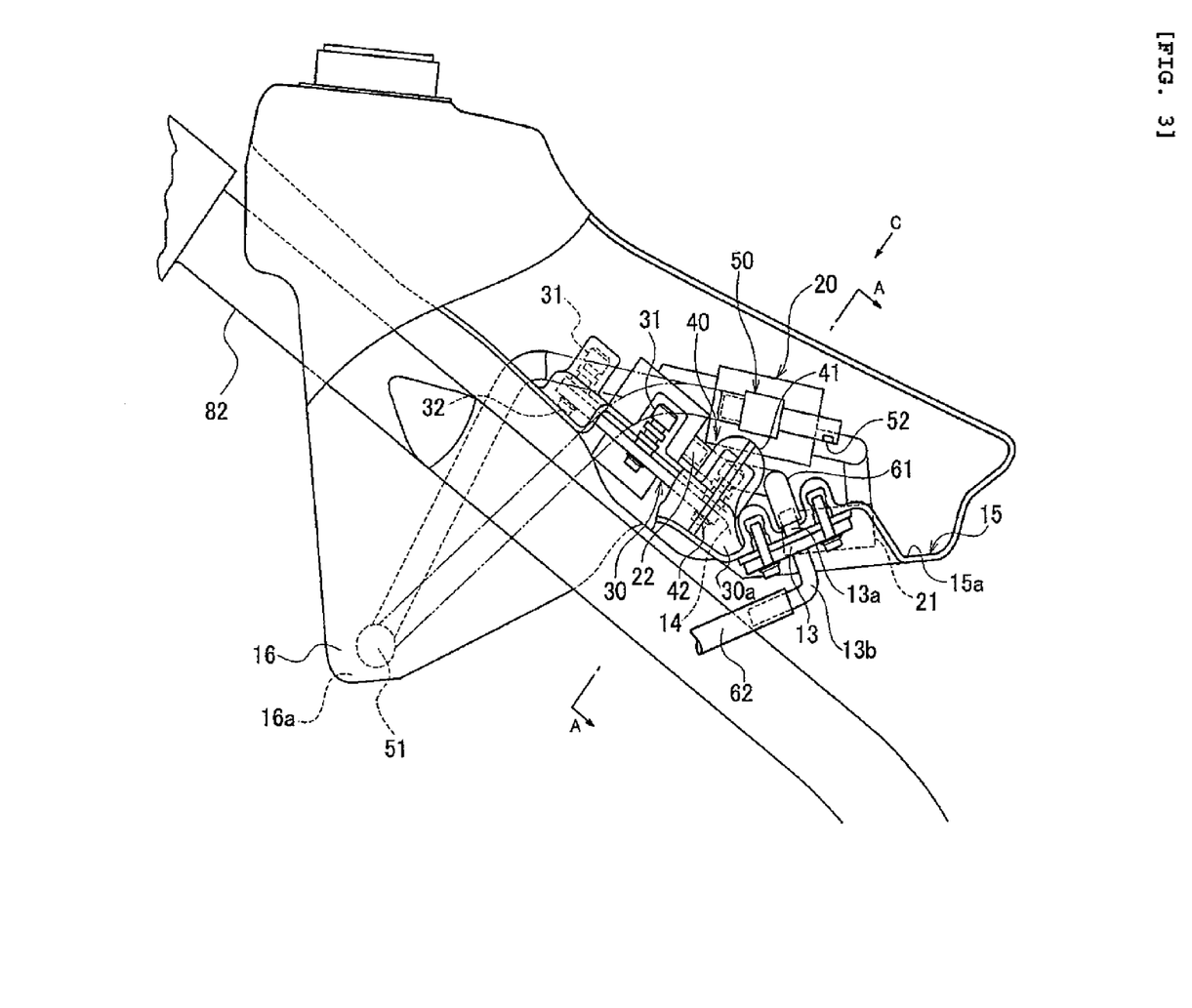
FIG. 3 is a side elevational view of the fuel supply device of the FIG. 1.
Figure 4:
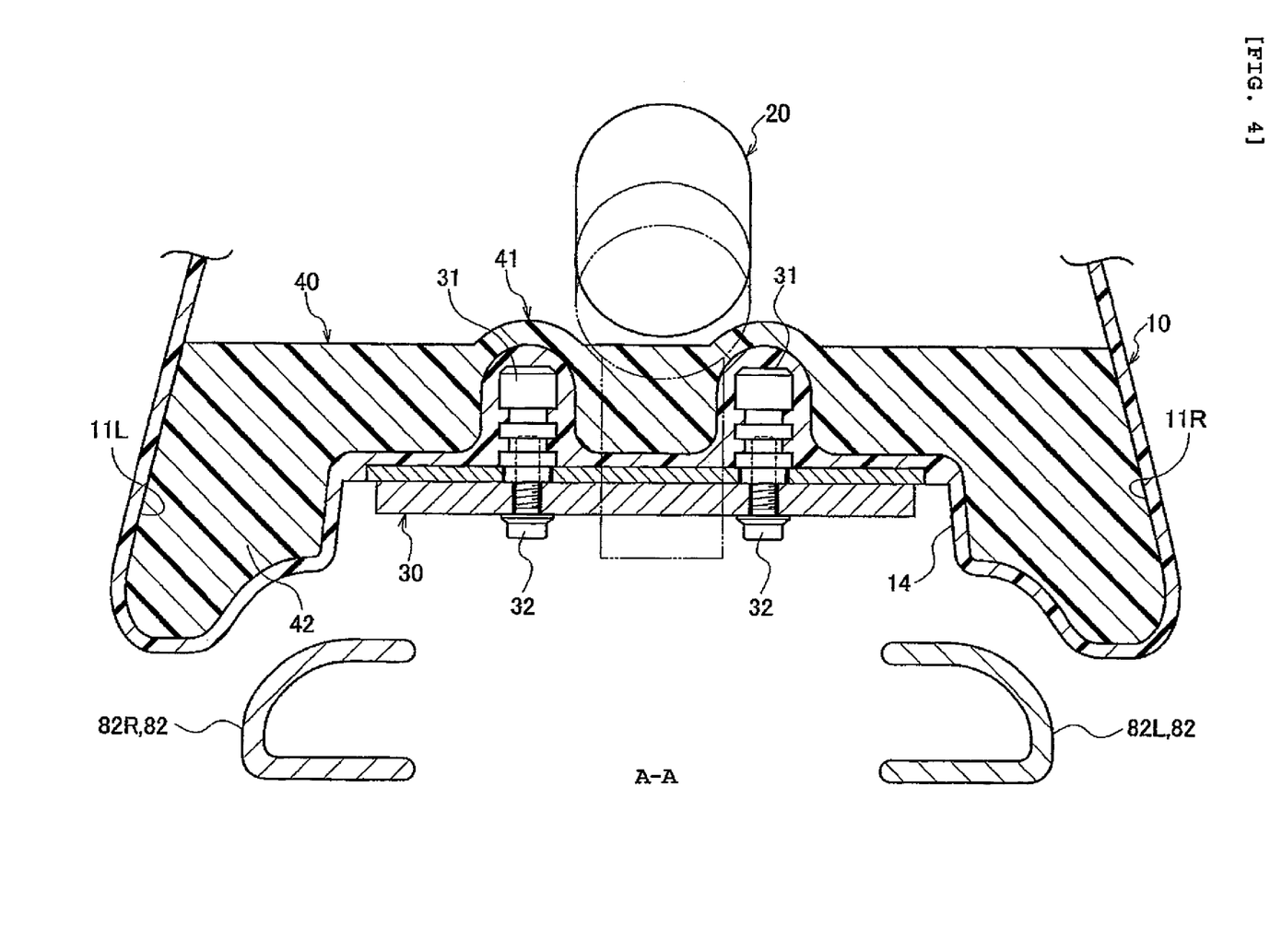
FIG. 4 is a cross sectional view taken along line A-A of FIG. 3.
Figure 5:
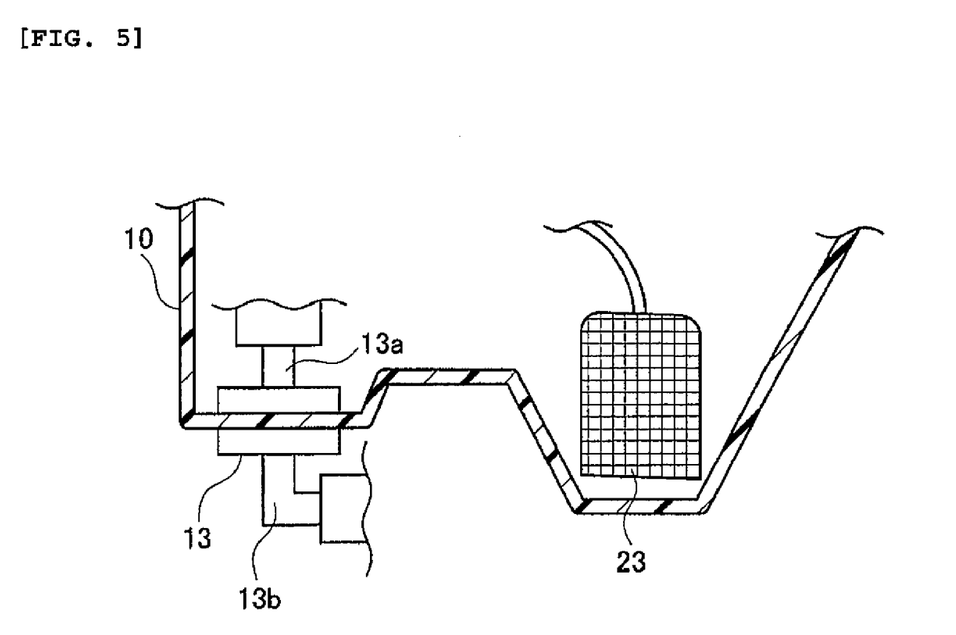
FIG. 5 is a cross sectional view taken along line B-B of FIG. 2.
Figure 6:
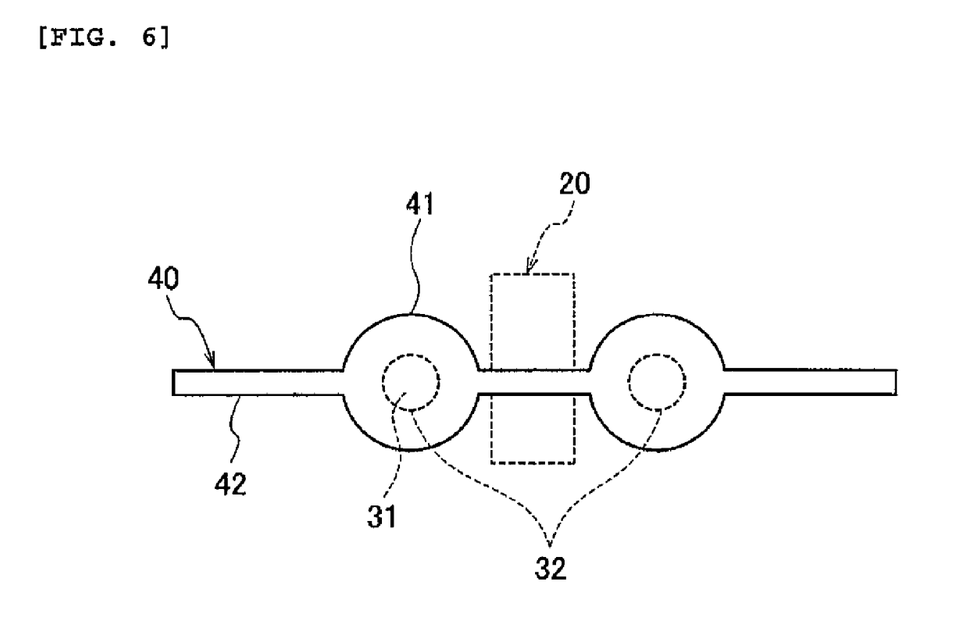
FIG. 6 is a top plan view of a pump support member according to the invention viewed in the direction of arrow C of FIG. 3.

An embodiment of the present invention is now described with reference to FIGS. 1-6. FIG. 1 is a side elevational view of a fuel supply device which is under a mounted condition to the vehicle. FIG. 2 is a top plan view of the fuel supply device which is under the mounted condition to the vehicle. FIG. 3 is a side elevational view of the fuel supply device. FIG. 4 is a cross sectional view taken along line A-A of FIG. 3. FIG. 5 is a cross sectional view taken along line B-B of FIG. 2. FIG. 6 is a top plan view of a pump support member viewed in the direction of arrow C of FIG. 3.

As shown in FIG. 1, a fuel supply device 1 is embodied in a vehicle 70 such as a motocross-bike. Fuel supply device 1 is mainly formed with a fuel tank 10 accumulating liquid fuel and a first fuel pump 20 suctioning the fuel in fuel tank 10 to supply the fuel to an engine 71 while pressurizing it.

A vehicle body frame 80 of vehicle 70 to which fuel supply device 1 is attached has a semi-double cradle configuration. As shown in FIGS. 1 and 2, a head pipe 81 is positioned at a front end of frame 80. An upper frame 82 is provided to a top end portion of head pipe 81, while an under frame 83 is provided to a bottom end of head pipe 81.

Upper frame 82 is formed with a pipe member. Upper frame 82 generally has a shape of the letter Y in which a right frame 82R and a left frame 82L are bifurcated in a width direction of vehicle 70 from an upper base frame 82a fixed to head pipe 81, and is formed to extend rearward and downward of vehicle 70 from head pipe 81. Right frame 82R and left frame 82L are coupled with under frame 83 at respective bottom end portions thereof. A seat rail 84 having a ladder shape and forming vehicle body frame 80 extends rearward of vehicle 70 from right frame 82R and left frame 82L, and a rider's seat 72 is fixed thereto.

Fuel tank 10 has a saddle shape and is disposed above vehicle body frame 80. A front portion of fuel tank 10 is divided into a right front tank section 11R and a left front tank section 11L to straddle upper base frame 82a and communicate with each other through a connecting section 11a positioned at a top portion of fuel tank 10. A rear portion of fuel tank 10 communicates with the front portion of fuel tank 10 and is disposed above right frame 82R and left frame 82L. The front portion of fuel tank 10 expands downward and is formed narrower from a front to a rear end portion as viewed from above and from a lateral side of vehicle 70. Fuel tank 10 is fixed to upper base frame 82 a using a front fixing section 12 positioned at a front end portion, and is fixed to seat rail 84 using a rear fixing section (not shown) positioned at a rear end portion.

A fuel supply port 13 for supplying fuel from tank 10 to engine 71 is positioned inside of vehicle body frame 80 in a width direction of vehicle 70 and is positioned at a bottom and peripheral end portion of tank 10. Fuel supply port 13 is disposed on a left side of fuel tank 10, where a side stand for supporting vehicle 70 when vehicle 70 is parked is disposed. An out-of-tank connecting section (not shown) of fuel supply port 13 and an injector 73 are connected to each other through a high pressure hose to supply fuel from tank 10 to engine 71.

A front end portion of rider's seat 72 overlaps and covers a top surface of fuel tank 10.

First fuel pump 20 is generally cylindrically shaped. A main suction port 21 is positioned on a tip end side of first fuel pump 20, while a main expelling port 22 is positioned on a base end side thereof. The base end side is fixed to the interior of fuel tank 10 via a mount seat 30. Mount seat 30 has a plurality of cap nuts 31 positioned in a circular seat surface on the interior side of fuel tank 10 and is fixed to fuel tank 10 by bolts 32.

First fuel pump 20 is formed such that a fuel route does not pierce mount seat 30 and only a wire harness for controlling first fuel pump 20 pierces mount seat 30 so that a portion protruding from mount seat 30 external to fuel tank 10 is small. Further, a mount recess 14 recessed to the interior side of fuel tank 10 is formed at a portion of fuel tank 10 to which mount seat 30 is attached to prevent the portion to which mount seat 30 is attached from protruding to the side of vehicle body frame 80 when first fuel pump 20 is mounted.

Mount seat 30 is positioned such that a portion thereof overlaps with right frame 82R and left frame 82L as viewed from above the vehicle and such that first fuel pump 20 is positioned between the right frame and the left frame.

First fuel pump 20 is disposed within the fuel tank in such a manner that the tip end side protrudes rearward of the vehicle generally parallel. A pump support member 40 is disposed between mount seat 30, which forms a bottom surface of fuel tank 10, and first fuel pump 20. Pump support member 40 is formed with a mount section 41 and a support partitioning wall section 42 as a partitioning plate. Pump support member 40 is interposed between first fuel pump 20 and mount seat 30 by putting mount section 41 onto cap nuts 31 in order not to come out. Support partitioning wall section 42 extends to side walls of fuel tank 10 to partition the bottom portion of fuel tank 10 into a forward portion and a rear portion. Thereby, a first liquid accumulating section 15 is formed such that a bottom surface 15a thereof is positioned at a rear part of the bottom portion of fuel tank 10 and at a location lower than a bottom surface 30a of mount seat 30. Main suction port 21 has a filter 23 positioned to suction fuel from first liquid accumulating section 15. Main expelling port 22 is connected to a tank-in connecting section 13a of fuel supply port 13 through a tank-in high pressure hose 61.

In fuel supply device 1, a jet pump 50 is disposed which acts as a second fuel pump using an ejector effect by fuel which first fuel pump 20 suctions. That is, a negative pressure is generated around a flow of the fuel accelerated by first fuel pump 20. Using the generated negative pressure, jet pump 50 suctions the fuel through auxiliary suction ports 51, which are suction ports of jet pump 50, and expels the fuel to first liquid accumulating section 15 in which an auxiliary expelling port 52, which is an expelling port of jet pump 50, is disposed. Additionally, auxiliary suction ports 51 are positioned on the side of mount seat 30 of the bottom portion of fuel tank 10 as second liquid accumulating sections. Auxiliary suction ports 51 are placed in a bottom surface 16a of a lowest portion 16 which is formed by being expanded in respective bottom end portions of right front tank section 11R and left front tank section 11L.

Regarding fuel supply routes, first, when first fuel pump 20 operates, main suction port 21 suctions fuel accumulating in first liquid accumulating section 15 and pressurizes the fuel to supply the fuel to injector 73 through tank-in high pressure hose 61, fuel supply port 13 and a high pressure hose 62.

First fuel pump 20 always operates to expel an amount of fuel corresponding to the maximum fuel consumption amount of engine 71. Because this is a surplus fuel supply amount under normal vehicle running conditions, a pressure regulator (not shown) makes the surplus fuel return to first liquid accumulating section 15 through a surplus fuel route. At this moment, the surplus fuel is supplied to jet pump 50 to suction the fuel in first liquid accumulating section 15 from lowest portion 16 of fuel tank 10, which is the second liquid accumulating section, by the negative pressure generated around the surplus fuel when the surplus fuel flows through the conduit.

Additionally, when fuel is supplied to engine 71 by first fuel pump 20, care must be taken to prevent cavitations from occurring in a suction head for first fuel pump 20 because such cavitations affect the fuel injection amounts of injector 73. On the other hand, when fuel is suctioned from the lowest portion of fuel tank 10 to first liquid accumulating section 15, jet pump 50 sufficiently functions because the cavitations, if any, do not affect the fuel injection amounts of injector 73.

Because first fuel pump 20 is disposed within fuel tank 10 in such a manner that at least the portion of mount seat 30 overlaps vehicle body frame 80, a size in the width direction of the vehicle can be smaller.

Because first fuel pump 20 is between right frame 82R and left frame 82L, first fuel pump 20 is protected by right frame 82R and left frame 82L even if vehicle 70 falls to the ground.

Because first fuel pump 20 is disposed within fuel tank 10 to protrude rearward of the vehicle, a size of the fuel tank in a vertical direction can be small. Thereby, a rider can easily transfer his or her weight to the upper portion of fuel tank 10 while riding, and maneuverability is thus improved. Also, because the suction head for first fuel pump 20 is small, first fuel pump 20 is compact while cavitations are prevented from occurring.

Because the first fuel pump 20 is supported by the pump support member 40, a shock transferred to the first fuel pump 20 when the vehicle 70 surmounts a bump can be reduced. Thereby, the mount seat 30 of the first fuel pump 20 can be smaller and the size in the width direction of the vehicle can be smaller.

Support partitioning wall section 42 partitions the bottom portion of fuel tank 10 to form bottom surface 15a of first liquid accumulating section 15 which is lower than bottom surface 30a of mount seat 30, and main suction port 21 is disposed in first liquid accumulating section 15. Therefore, even though a surface of the fuel waves within fuel tank 10 while the vehicle runs and is not stable, first fuel pump 20 steadily suctions the fuel.

Jet pump 50 using the ejector effect by fuel which first fuel pump 20 suctions is provided, auxiliary suction ports 51 are positioned in the lowest portion of fuel tank 10, and auxiliary expelling port 52 is positioned in first liquid accumulating section 15. If first fuel pump 20 directly suctions fuel, cavitations can occur and make steady suction difficult. Therefore, jet pump 50 temporarily suctions fuel accumulating at lowest portion 16 of fuel tank 10 to first liquid accumulating section 15 and then first fuel pump 20 suctions the fuel from first liquid accumulating section 15. Because the bottom configuration of fuel tank 10 is a configuration suitable for maneuvering, maneuverability of vehicle 70 is improved.

Because the front portion of fuel tank 10 is swelled out downward, the height of the tank can be lowered, while the capacity of the tank is sufficiently ensured. Therefore, the rider can easily transfer his or her weight onto the upper portion of the fuel tank while riding, and maneuverability is improved.

Because rider's seat 72 is overlaps with the top surface of fuel tank 10, the rider can easily transfer his or her weight onto the upper portion of fuel tank 10 while riding, and the maneuverability is improved.

Fuel supply port 13 is positioned at the bottom and peripheral end portion of fuel tank 10 and is also positioned inside of vehicle body frame 80 as viewed from above vehicle 70. Thus, workability for attaching and detaching fuel tank 10 to and from vehicle 70 is improved, and vehicle body frame 80 protects fuel supply port 13 when vehicle 70 falls to the ground.

Additionally, the portion to which mount seat 30 of fuel tank 10 is attached does not protrude to the side of vehicle body frame 80; thereby, the area where mount seat 30 overlaps with vehicle body frame 80 is increased.

Also, the fuel supply port has no means for opening and closing the flow path because fuel is prevented from flowing out under the condition that first fuel pump 20 is stopped.

However, by providing a fuel cock to open and close the flow path, a fuel leak when fuel tank 10 is attached or detached can be further prevented.

Figure 7:
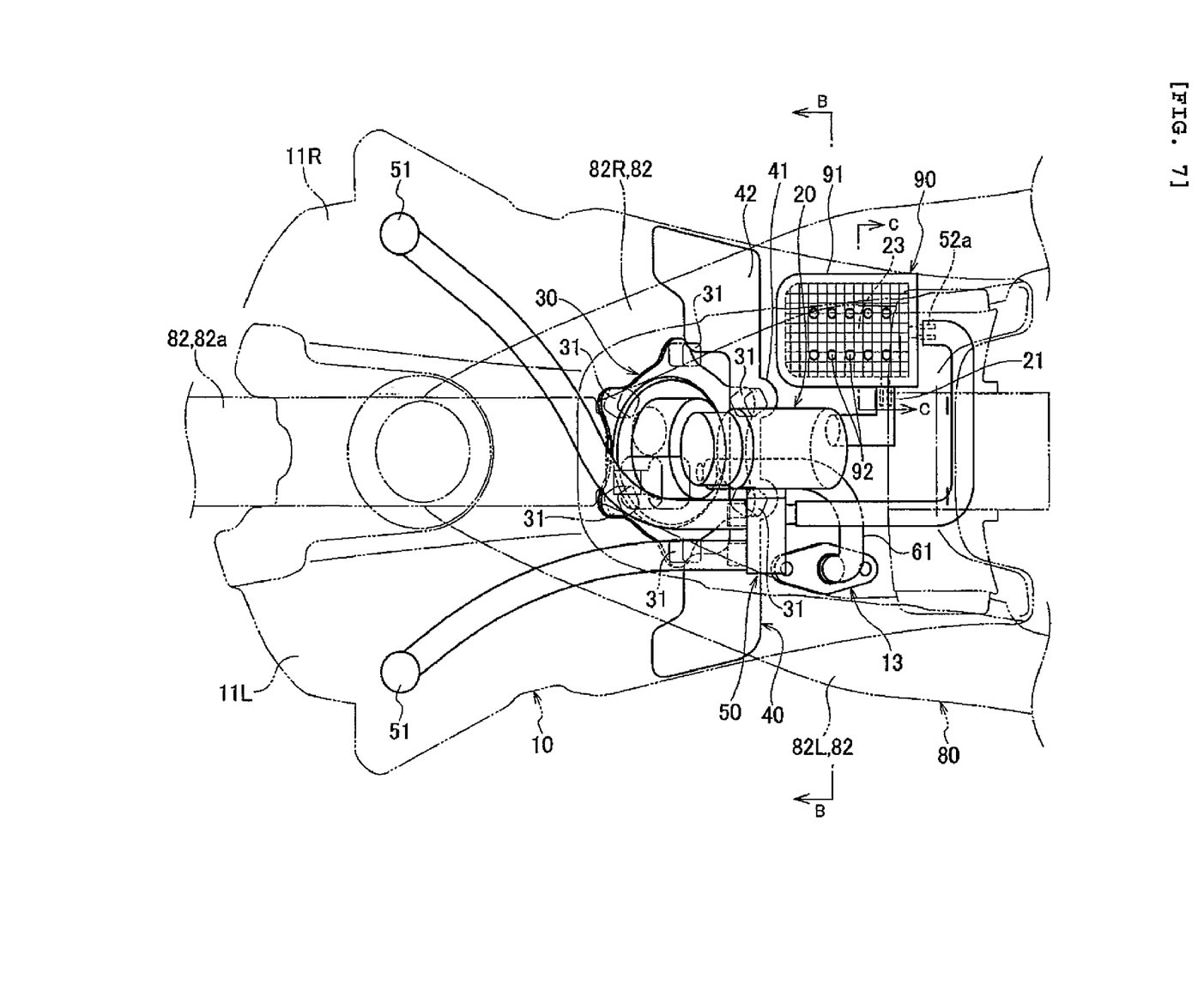
FIG. 7 is a top plan view of a fuel supply device of an alternative embodiment of the invention which is under a mounted condition to a vehicle.
Figure 8:
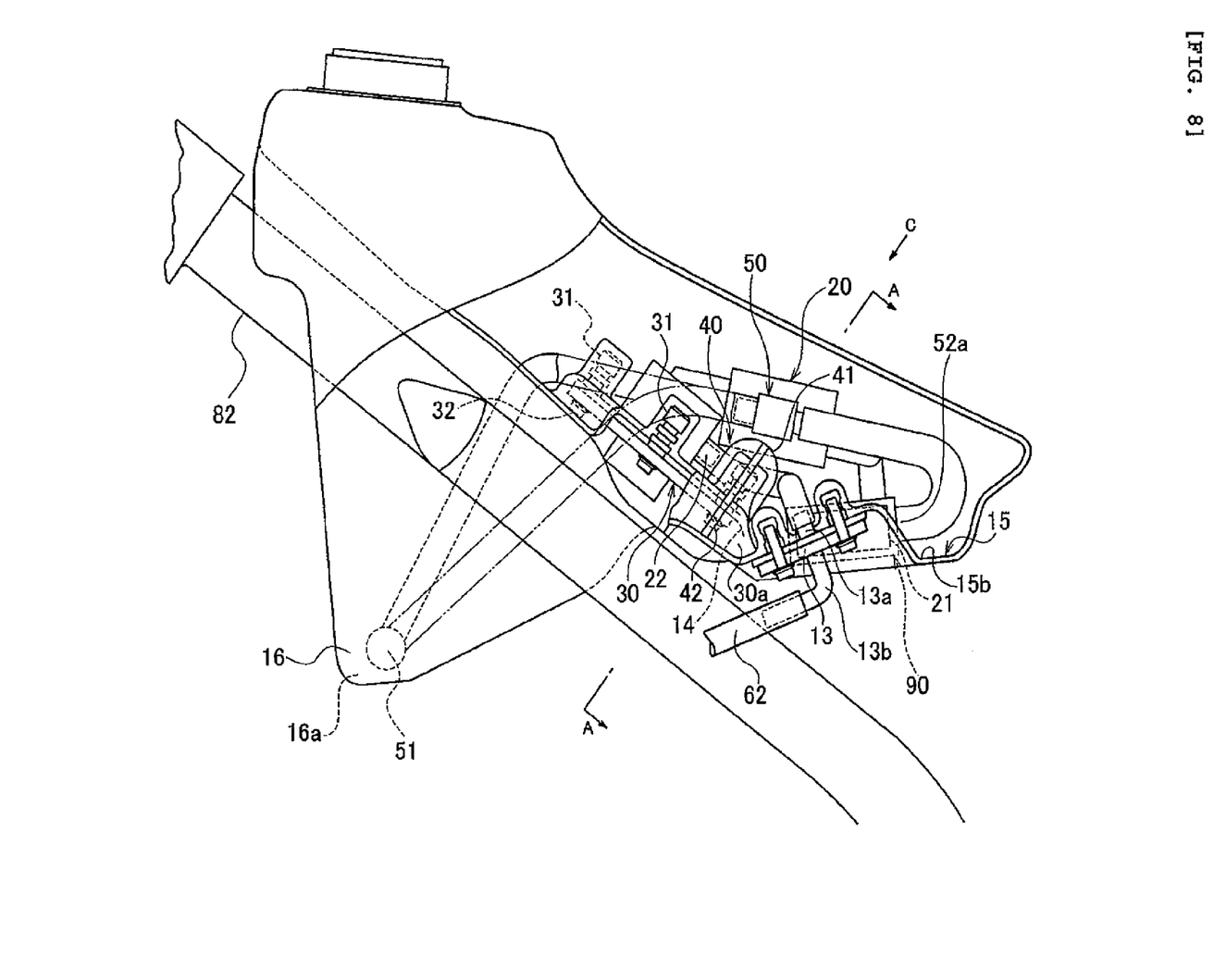
FIG. 8 is a side elevational view of the fuel supply device of FIG. 7.
Figure 9:
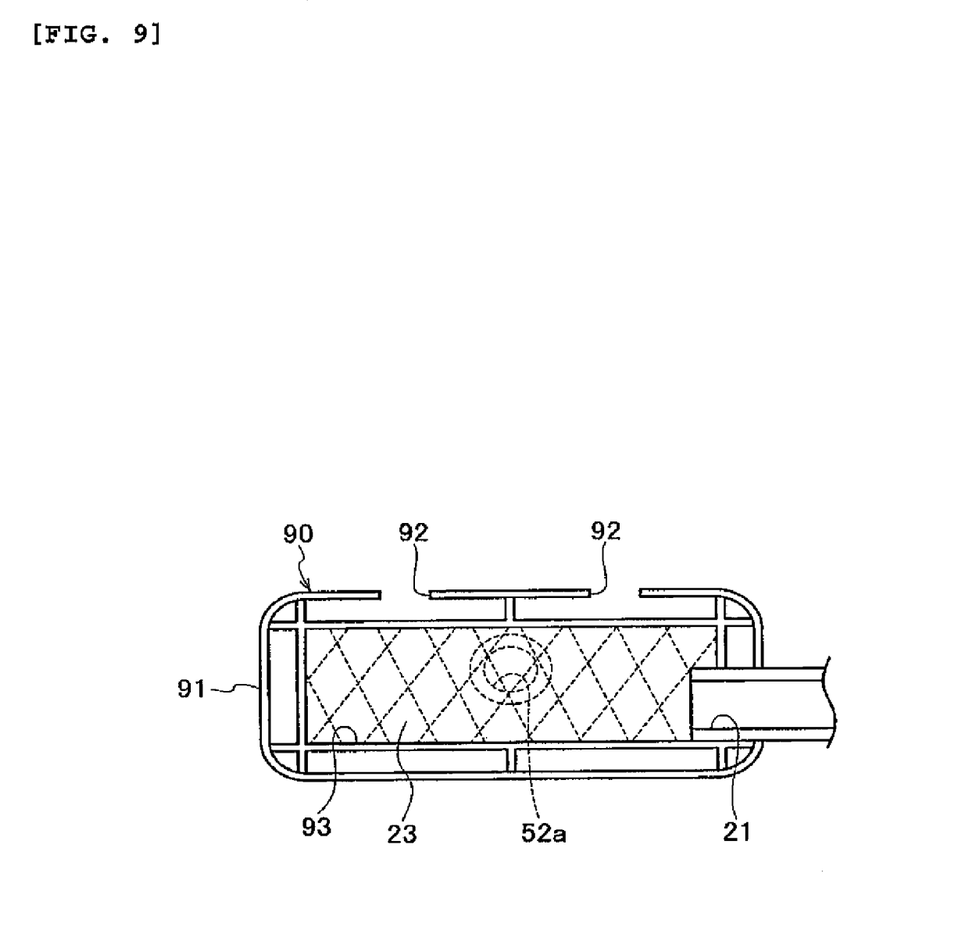
FIG. 9 is a cross sectional view taken along line D-D of FIG. 7.

Next, an alternative embodiment of the invention is described with reference to FIGS. 7-9. FIG. 7 is a top plan view of a fuel supply device which is under a mounted condition to the vehicle. FIG. 8 is a side elevational view of the fuel supply device. FIG. 9 is a cross sectional view taken along line D-D of FIG. 7.

A point of difference relative to the first embodiment resides in the structure of a part of main suction port 21 of first fuel pump 20. Although filter 23 is connected to main suction port 21 in the first embodiment, an accumulating chamber 90 is formed at main suction port 21 in this alternative embodiment. Because structures of the remaining parts are the same as those in the first embodiment, duplicate descriptions are omitted and the same structural portions in the drawings are assigned with the same reference numerals or symbols.

Accumulating chamber 90 is placed at lowest bottom surface 15*b* in first liquid accumulating section 15. Accumulating chamber 90 is formed by separating walls 91 to ensure an internal capacity, as a preset internal capacity, with which engine 71 can continue operating for at least several seconds even though only the fuel in accumulating chamber 90 is used. Also, in accumulating chamber 90, an enclosing section 93 spaced apart from separating walls 91 is formed. Enclosing section 93 is filled with a filter 23.

Supply openings 92 connecting first liquid accumulating section 15 and the interior to each other are disposed in a center area of a top surface of accumulating chamber 90. Main suction port 21 of first fuel pump 20 is connected to a lateral side surface of accumulating chamber 90 on a side of the center of the vehicle.

An auxiliary expelling port 52*a* is connected to a rear surface of accumulating chamber 90. Surplus fuel returning from the injector of first fuel pump 20 is expelled from auxiliary expelling port 52*a* into accumulating chamber 90, and fuel in the lowest portion suctioned by jet pump 50 is expelled from auxiliary expelling port 52*a* into accumulating chamber 90.

When the quantity of fuel expelled to accumulating chamber 90 is greater than the quantity of fuel suctioned through main suction port 21, the fuel is expelled from supply openings 92 of the top surface to first accumulating section 15. When the quantity of fuel expelled from auxiliary expelling port 52*a* is less than the quantity of fuel suctioned through main suction port 21, the fuel is supplied from liquid accumulating section 15 to accumulating chamber 90 through supply openings 92.

In a structure where fuel is sprayed into intake air using an injector, there is no chamber like a float chamber and thus a shortage of fuel in fuel tank 10 results. If the position of the vehicle changes in a running state, a position of a liquid surface in fuel tank 10 varies to cause a condition under which fuel cannot be suctioned through main suction port 21. Under such condition, no fuel is supplied and engine 71 stops.

However, in the alternative discussed above, in which accumulating chamber 90 is provided and fuel is suctioned from accumulating chamber 90, engine 71 continues operating without being affected by the position of the vehicle.

Also, because supply openings 92 are disposed in the center area of the top surface of accumulating chamber 90, the interior of accumulating chamber 90 is always filled with fuel without being affected by the position of the vehicle.

Because returning fuel is directly supplied to accumulating chamber 90, the interior of accumulating chamber 90 is always filled with fuel without being affected by the position of the vehicle.

Because jet pump 50 is disposed to suction fuel accumulating in lowest portion 16 and to expel the fuel into accumulating chamber 90, the fuel directly supplied to accumulating chamber 90 increases. The influence of the position of the vehicle thus becomes smaller.

Additionally, fuel tank 10 is formed so that accumulating chamber 90 is fitted into a part of lowest bottom surface 15*b* of first liquid accumulating section 15. Therefore, all fuel in first liquid accumulating section 15 is supplied to accumulating chamber 90 through supply openings 92.

The particular embodiments of the invention described in this document should be considered illustrative, rather than restrictive. Modification to the described embodiments may be made without departing from the spirit of the invention as defined by the following claims.

The invention claimed is:

1. A fuel supply device for a motorcycle comprising:
a body frame extending in a fore to aft direction of the motorcycle;
a fuel tank disposed above the body frame;
a first fuel pump attached to a bottom portion of the fuel tank via a mount seat; and
a rider's seat that covers a top surface of the fuel tank as viewed from a lateral side of the motorcycle, wherein a forward end of the seat is positioned before the first fuel pump,
wherein at least a portion of the mount seat overlaps with the body frame as viewed from above the motorcycle.

2. The fuel supply device of claim 1, wherein the body frame includes a right frame and a left frame in the width direction, and the first fuel pump is positioned between the right frame and the left frame in the width direction.

3. The fuel supply device for of claim 2, wherein the fuel tank comprises:
a right side tank section positioned on an outer lateral side of the right frame;
a left side tank section positioned on an outer lateral side of the left frame; and
a connecting section for connecting the right side tank section and the left side tank section such that the connecting section straddles the right frame and the left frame.

4. The fuel supply device of claim 2, wherein the first fuel pump is disposed within the fuel tank to incline rearward and downward of the motorcycle.

5. The fuel supply device of claim 4, wherein a pump support member for supporting the first pump is disposed between the first pump and the mount seat.

6. The fuel supply device of claim 4, and further comprising a partition plate for partitioning the bottom portion of the fuel tank into a side of the mount seat and another side of a first liquid accumulating section in which a suction port of the first fuel pump is positioned.

7. The fuel supply device of claim 6, wherein a bottom surface of the first liquid accumulating section is positioned lower than a bottom surface of the mount seat.

8. The fuel supply device of claim 6, wherein the pump support member includes the partition plate partitioning the bottom portion of the fuel tank.

9. The fuel supply device for of claim 6, wherein a second liquid accumulating section is formed on the side of the mount seat of the bottom portion of the fuel tank, a bottom surface of the second liquid accumulating section is positioned lower than a bottom of the first liquid accumulating section, and the bottom of the second liquid accumulating section has a second fuel pump that suctions fuel accumulating in the second liquid accumulating section and expels the fuel to the first liquid accumulating section.

10. The fuel supply device of claim 9, wherein a filter is connected to the suction port of the first fuel pump.

11. The fuel supply device of claim 9, wherein the second fuel pump is a let pump suctioning fuel accumulating in the second liquid accumulating section using a negative pressure generated by a flow of surplus fuel returning from an injector of the first fuel pump.

12. The fuel supply device of claim 9, wherein the second liquid accumulating section is formed in a front portion of the fuel tank.

13. The fuel supply device of claim 1, wherein the fuel tank has a fuel supply port for supplying fuel to an engine, and the fuel supply port is positioned at a bottom portion and a peripheral end portion of the fuel tank.

14. The fuel supply device of claim 1, wherein the fuel supply port is positioned between a right end and a left end of the body frame.

15. The fuel supply device of claim 10, wherein the first fuel pump is generally positioned at a center of the fuel tank in the width direction, the fuel supply port is positioned on one side in the width direction relative to a position where the first fuel pump is disposed, and the filter is positioned on the other side in the width direction relative to the position where the first fuel pump is disposed.

16. The fuel supply device of claim 6, and further comprising
an accumulating chamber disposed in the first liquid accumulating section and having the suction port of the first fuel pump, and
a supply port connecting the first liquid accumulating section and an inside of the accumulating chamber formed at a top surface of the accumulating chamber.

17. The fuel supply device of claim 16, wherein the accumulating chamber is positioned at a bottom end which is the lowest portion of the first liquid accumulating section.

18. The fuel supply device of claim 16, and further comprising a filter connected to the suction port of the first fuel pump and positioned inside of the accumulating chamber.

19. The fuel supply of claim 16, wherein the accumulating chamber comprises an enclosing section for enclosing the filter, and a separating wall is spaced a predetermined distance apart from the enclosing section to cover the enclosing section, and the separating wall has the supply port.

20. The fuel supply device of claim 16, wherein the supply port is positioned at a center portion of the top surface.

21. The fuel supply device of claim 16, wherein the accumulating section has an auxiliary expelling port for expelling surplus fuel returning from an injector of the first fuel pump.

22. The fuel supply device for of claim 16, wherein a second liquid accumulating section is formed on the side of the mount seat of the bottom portion of the fuel tank, a bottom surface of the second liquid accumulating section is positioned lower than a bottom surface of the first liquid accumulating section, and the bottom of the second liquid accumulating section has a second fuel pump that suctions fuel accumulating in the second liquid accumulating section and expels the fuel to the accumulating chamber.

23. A motorcycle comprising:
a body frame extending in a fore to aft direction of the motorcycle;
a fuel tank disposed above the body frame;
a first fuel pump attached to a bottom portion of the fuel tank via a mount seat; and
a rider's seat that covers a top surface of the fuel tank as viewed from a lateral side of the motorcycle, wherein a forward end of the seat is positioned before the first fuel pump,
wherein at least a portion of the mount seat overlaps the body frame as viewed from above the motorcycle.

* * * * *